(12) United States Patent  (10) Patent No.: US 8,611,278 B2
Chen et al.  (45) Date of Patent: Dec. 17, 2013

(54) MOBILE DEVICE, BASE STATIONS, BACKHAUL NETWORK DEVICE, AND METHOD AND COMPUTER PROGRAM STORAGE PRODUCT FOR THE MOBILE DEVICE

(75) Inventors: Chiu-Wen Chen, Taipei (TW); Chun-Yen Hsu, Minxiong Township (TW)

(73) Assignee: Institute for Information Industry, Taipei (TW)

( * ) Notice: Subject to any disclaimer, the term of this patent is extended or adjusted under 35 U.S.C. 154(b) by 394 days.

(21) Appl. No.: 12/764,509

(22) Filed: Apr. 21, 2010

(65) Prior Publication Data

US 2010/0265818 A1   Oct. 21, 2010

Related U.S. Application Data

(60) Provisional application No. 61/171,452, filed on Apr. 21, 2009.

(51) Int. Cl.
    *H04W 4/00*   (2009.01)
(52) U.S. Cl.
    USPC .......................................... 370/328; 370/331
(58) Field of Classification Search
    None
    See application file for complete search history.

(56) References Cited

U.S. PATENT DOCUMENTS

| | | | | |
|---|---|---|---|---|
| 6,070,084 | A * | 5/2000 | Hamabe | 455/522 |
| 6,810,259 | B1 * | 10/2004 | Zhang | 455/456.5 |
| 7,110,767 | B2 * | 9/2006 | Motegi et al. | 455/445 |
| 7,961,849 | B2 * | 6/2011 | Sparks et al. | 379/45 |
| 8,068,838 | B1 * | 11/2011 | Dinan et al. | 455/436 |
| 2001/0021650 | A1 * | 9/2001 | Bilgic | 455/418 |
| 2002/0115442 | A1 * | 8/2002 | Dorenbosch | 455/446 |
| 2002/0196752 | A1 * | 12/2002 | Attar et al. | 370/331 |
| 2003/0054825 | A1 * | 3/2003 | Chen et al. | 455/442 |
| 2005/0096051 | A1 * | 5/2005 | Lee et al. | 455/438 |
| 2006/0111101 | A1 * | 5/2006 | Chien et al. | 455/423 |
| 2007/0104179 | A1 * | 5/2007 | Srinivasan et al. | 370/351 |
| 2007/0173279 | A1 * | 7/2007 | Kuroda et al. | 455/522 |
| 2008/0058000 | A1 * | 3/2008 | Tanaka et al. | 455/550.1 |
| 2008/0075013 | A1 * | 3/2008 | Kim | 370/242 |
| 2008/0117842 | A1 * | 5/2008 | Rao | 370/310 |
| 2008/0171569 | A1 * | 7/2008 | Pralle et al. | 455/525 |
| 2008/0261641 | A1 * | 10/2008 | Tang et al. | 455/517 |
| 2008/0261642 | A1 * | 10/2008 | Tang et al. | 455/517 |
| 2008/0268853 | A1 * | 10/2008 | Bosch et al. | 455/442 |
| 2009/0082072 | A1 * | 3/2009 | Ulupinar et al. | 455/574 |
| 2009/0201801 | A1 * | 8/2009 | Ono | 370/221 |
| 2010/0015996 | A1 * | 1/2010 | Hirose | 455/456.1 |
| 2010/0159936 | A1 * | 6/2010 | Brisebois et al. | 455/450 |
| 2011/0281581 | A1 * | 11/2011 | Brandt et al. | 455/427 |
| 2011/0292859 | A1 * | 12/2011 | So et al. | 370/312 |

* cited by examiner

*Primary Examiner* — Otis L Thompson, Jr.
(74) *Attorney, Agent, or Firm* — Skaar Ulbrich Macari, P.A.

(57) ABSTRACT

A mobile device, base stations, a backhaul network device for a wireless network system, and a method and a computer program storage product for the mobile device are provided. Each of the base stations is connected to the backhaul network device via a wired connection. The mobile device selects a primary base station and a backup base station from the base stations according to base station information of each base station. The mobile device performs a data transmission procedure with the primary base station during an available interval of a low-duty mode to communicate with the backhaul network device via the primary base station, and performs a connection keeping procedure with the backup base station during an unavailable interval of the low-duty mode. While the data transmission procedure fails, the mobile device performs a data transmission recovery procedure with the backup base station immediately so as to continuously communicate with the backhaul network device via the backup base station.

38 Claims, 12 Drawing Sheets

MOBILE DEVICE, BASE STATIONS, BACKHAUL NETWORK DEVICE, AND METHOD AND COMPUTER PROGRAM STORAGE PRODUCT FOR THE MOBILE DEVICE

PRIORITY

This application claims the priority benefit of priority of U.S. Provisional Patent Application No. 61/171,452, filed on Apr. 21, 2009, the disclosure of which is incorporated herein by reference in its entirety.

FIELD

The present invention relates to a mobile device, base stations, a backhaul network device for a wireless network system, and a method and a computer program storage product for the mobile device; and more particularly, the present invention relates to a mobile device, base stations, a backhaul network device that are capable of keeping data transmission continuous, and a method and a computer program storage product for the mobile device.

BACKGROUND

Owing to development of science and technology, applications of wireless communication technologies have become increasingly widespread. Many of the wireless communication technologies, such as those adopting GSM (Global System for Mobile Communications), WCDMA (Wideband Code Division Multiple Access), GPRS (General Packet Radio Service), PHS (General Packet Radio Service), WiFi (Wireless Fidelity), WiMAX (Worldwide Interoperability for Microwave Access) or LTE (Long Term Evolution), rely on a base station (BS) to provide wireless voice, image, data communication and mobile device positioning services.

For wireless communication systems, whether they adopt the WiMAX or the LTE wireless communication technology, BSs thereof are typically deployed on the basis of the cellular communication concept and designed with a high power level and large communication coverage. However, although macro BSs have already been deployed at a considerably high density, most indoor environments still suffer from degradation in wireless communication quality due to the shadow effect of buildings; and the shadow effect of buildings may even result in coverage holes that cause failure of service providers to provide services effectively.

In order to reduce the coverage holes, improve the system capacity and make more efficient use of the wireless bandwidth resources of the wireless communication system, more concerns have been gradually put on Femtocell BSs in addition to the original deployment of the macro BSs, and the Femtocell BS technology has been considered as one of the key technologies for the next generation of wireless communication. Albeit of the smaller signal coverage of the Femtocell BSs as compared to the macro BSs, the Femtocell BSs have advantages of a low power level and low production cost, so they can be widely deployed in indoor environments to improve the wireless communication quality. Additionally, in the wireless network systems, the bandwidth originally allocated to the macro BSs may also be re-allocated to individual Femtocell BSs to improve the bandwidth efficiency of the wireless communication system.

However, in a wireless communication system, a mobile device can perform data transmission with only a single BS at a given time point; and during the data transmission, it is possible that the connection between the mobile device and the BS is interrupted if the BS ceases providing the services or suffers from interference. In either case, consequently, the mobile device has to find another BS and perform a network entry procedure with the another BS again in order to recover the data transmission; this will cause discontinuity of the data transmission between the mobile device and the BS and also delay in the data transmission.

Accordingly, efforts still have to be made by wireless communication network providers and wireless communication device manufacturers to address the desire of the general public for a solution that can reduce or obviate data transmission discontinuity and/or delay due to interruption of a connection between the mobile device and the BS without modifying the hardware architecture of the existing wireless communication systems.

SUMMARY

An objective of the present invention is to provide a mobile device, BSs and a backhaul network device for a wireless network system. Each of the BSs is connected to the backhaul network device either directly or indirectly through a wired or wireless connection, and the mobile device works in a low-duty mode comprising an available interval and an unavailable interval.

To achieve the aforesaid objective, the mobile device of certain embodiments of the present invention comprises a communication module and a process module. The communication module is configured to receive BS information of each of the BSs. The process module is electrically connected to the communication module, and configured to select a primary BS and a backup BS from the BSs according to the BS information of each of the BSs. Then, the communication module performs a data transmission procedure with the primary BS during the available interval to communicate with the backhaul network device via the primary BS, and performs a connection keeping procedure with the backup BS during the unavailable interval. When the communication module communicates with the backhaul network device via the primary BS, the process module is further configured to determine that the data transmission procedure fails and enable the communication module to perform a data transmission recovery procedure with the backup BS so that the communication module continuously communicates with the backhaul network device via the backup BS.

Furthermore, the primary BS of certain embodiments of the present invention comprises a communication module, which is configured to perform the data transmission procedure with the mobile device during the available interval so that the mobile device communicates with the backhaul network device via the primary BS.

Furthermore, the backup BS of certain embodiments of the present invention also comprises a communication module, which is configured to perform a connection keeping procedure with the mobile device during the unavailable interval. When the mobile device communicates with the backhaul network device via the primary BS and determines that the data transmission procedure fails, the communication module performs the data transmission recovery procedure with the mobile device immediately so that the mobile device continuously communicates with the backhaul network device via the backup BS.

Furthermore, the backhaul network device of certain embodiments of the present invention also comprises a communication module, which is configured to communicate with the mobile device via the primary BS when the mobile device performs a data transmission procedure with the primary BS during the available interval. When the communication module communicates with the mobile device via the primary BS and the mobile device determines that the data transmission procedure fails, the mobile device performs the data transmission recovery procedure with the backup BS so that the communication module continuously communicates with the mobile device via the backup BS.

Another objective of the present invention is to provide a method for the aforesaid mobile device, which comprises the steps of: receiving BS information of each of the BSs; selecting a primary BS and a backup BS from the BSs according to the BS information of each of the BSs; performing a data transmission procedure with the primary BS during the available interval to communicate with the backhaul network device via the primary BS; performing a connection keeping procedure with the backup BS during the unavailable interval; when communicating with the backhaul network device via the primary BS, determining that the data transmission procedure fails; and performing a data transmission recovery procedure with the backup BS so that the communication module continuously communicates with the backhaul network device via the backup BS.

Yet a further objective of the present invention is to provide a computer program storage product, which stores a program of a method for the aforesaid mobile device. When the program is loaded into the mobile device via a computer, the aforesaid method for the mobile device will be executed and accomplished.

According to the above descriptions, if the data transmission between the mobile device and the primary BS of the present invention fails, the mobile device can still proceed with the data transmission via the backup BS instead. Accordingly, the wireless network system of the present invention can address the deficiencies of the prior art that, when a connection between a mobile device and a BS with which the mobile device originally performs data transmission is interrupted, the mobile device has to find another BS to perform a network entry procedure in order to recover the data transmission.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
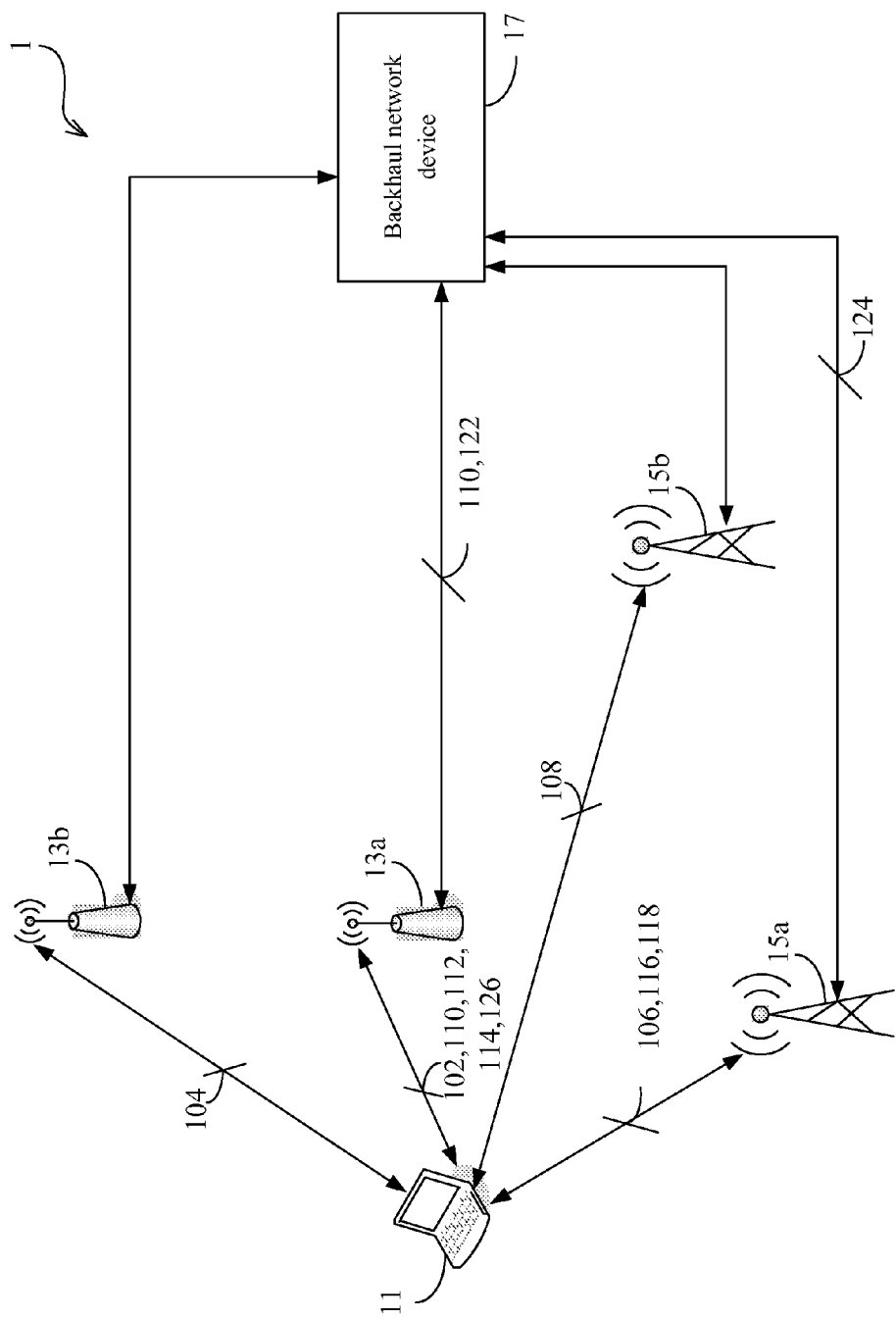
FIG. 1 is a schematic view of a wireless network system according to a first example embodiment of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the present invention will be explained with reference to example embodiments thereof. However, these example embodiments are not intended to limit the present invention to any specific environment, applications or particular implementations described in these example embodiments. Therefore, description of these example embodiments is only for purpose of illustration rather than to limit the present invention. It shall be appreciated that, in the following example embodiments and the attached drawings, elements unrelated to the present invention are omitted from depiction; and dimensional relationships among individual elements in the attached drawings are illustrated only for ease of understanding, but not to limit the actual scale.

A first example embodiment of the present invention is shown in FIG. 1, which depicts a wireless network system 1 of the present invention. The wireless network system 1 comprises a mobile device 11, a plurality of BSs 13a, 13b, 15a, 15b, and a backhaul network device 17. In this example embodiment, the wireless network system 1 is implemented according to the WiMAX/802.16m wireless communication standards. However, in other example embodiments, the wireless network system 1 may also be implemented according to other wireless communication standards, for example, the 3G-LTE ($3^{rd}$-generation long-term evolution) wireless communication standards. Upon reviewing the exemplary embodiments described in the present invention, those of ordinary skill in the art may readily appreciate how the wireless network system 1 of the present invention operates according to other wireless communication standards, so this will not be further described herein.

The mobile device 11 may be a cell phone, a personal digital assistant (PDA), a laptop computer or some other device with mobile communication functionality. Each of the BSs 13a, 13b is a Femtocell BS, which has small signal coverage and is typically deployed in an indoor environment. Each of the BSs 15a, 15b may be a Macrocell BS, a Picocell BS, a Microcell BS or a relay BS, which has large signal coverage and delivers good communication quality. Each of the BSs 13a, 13b, 15a, 15b may be connected to the backhaul network device 17 either directly or indirectly through a wired or wireless connection. In practical application, the backhaul network device 17 is communication equipment of a wireless communication service provider, which is configured to provide Internet connection services, voice communication, video communication and other data transmission services. In this example embodiment, the mobile device 11 works in a low-duty mode during the data transmission, the BSs 13a, 13b may work in an active mode or a low-duty mode during the data transmission, and the BSs 15a, 15b work in an active mode during the data transmission. The active mode represents a status in which data transmission can be proceed at any time, and the low-duty mode represents a status that has an available interval and an unavailable interval during the data transmission, details of which will be described later.

Assuming that the mobile device 11 is located within signal coverage of the BSs 13a, 13b, 15a, 15b simultaneously, then the mobile device 11 receives BS information 102, 104, 106, 108 from the BSs 13a, 13b, 15a, 15b respectively. The BS information 102, 104, 106, 108 may comprise an identification (ID), service loading conditions and other information of the BSs 13a, 13b, 15a, 15b respectively. Additionally, the mobile device 11 may also obtain signal measurements such as a received signal strength indication (RSSI), a signal to interference and noise ratio (SINR) and a carrier to interference and noise ratio (CINR) relative to the BSs 13a, 13b, 15a, 15b from the BS information 102, 104, 106, 108.

Then, the mobile device 11 estimates quality of communications between the mobile device 11 and each of the BSs 13a, 13b, 15a, 15b according to the service loading conditions and the abovementioned measurements of each of the BSs, selects a primary BS (e.g., the BS 13a), which provides the best communication quality, from the BSs 13a, 13b and selects a backup BS (e.g., a BS 15a), which provides the best communication quality, from the BSs 15a, 15b. Thereafter, the mobile device 11 performs a network entry procedure with the BS 13a to connect to the backhaul network device 17 via the BS 13a, and performs a backup network entry procedure with the BS 15a to establish another path for communication with the backhaul network device 17.

It shall be appreciated that, in this example embodiment, the BS 13a is located closer to the mobile device 11 than the BS 13b, so it can provide the mobile device 11 with better communication quality; and the BS 15a is located closer to the mobile device 11 than the BS 15b, so it can also provide the mobile device 11 with better communication quality. However, in practical applications, statuses of the communication quality vary with the environment where the mobile device 11 is located. Furthermore, in other example embodiments, the wireless network system 1 may comprise more Femtocell BSs, Macrocell BSs, Picocell BSs, Microcell BSs and relay BSs. As long as the mobile device 11 is located within signal coverage of these BSs, the mobile device 11 can select a primary BS, which provides the best communication quality, from the Femtocell BSs according to the service loading conditions and the aforesaid measurements obtained from the BS information of the BSs. If needed, the mobile device 11 also can select a backup BS, which provides the best communication quality, from the Macrocell BSs (or Picocell BSs, Microcell BSs or relay BSs) according to the service loading conditions and the aforesaid measurements obtained from the BS information of the BSs. If, the mobile device 11 is located in the environment in which the wireless network system 1 only comprises a single Femtocell BS and a single Macrocell BS (or Picocell BS, Microcell BS or relay BS), the mobile device 11 is probably only located within signal coverage of the single Femtocell BS and the single Macrocell BS. In this case, the mobile device 1 will select the Femtocell BS as the primary BS and the Macrocell BS as the backup BS.

More specifically, after selecting the BS 13a as the primary BS, the mobile device 11 may select, by itself, the BS 15a as the backup BS, or after having performed the network entry procedure with the BS 13a, select the BS 15a as the backup BS according to a suggestion message 110 transmitted by the backhaul network device 17 or the BS 13a. For example, when the mobile device 11 considers that the quality of communication with the BS 13a is poor (i.e., this is determined according to the service loading conditions and the measurements of the BS 13a), the mobile device 11 can select, by itself, the BS 15a as the backup BS according to the service loading conditions and the measurements of the BSs 15a, 15b. On the other hand, if, after the mobile device 11 has performed the network entry procedure with the BS 13a, the BS 13a or the backhaul network device 17 considers that the quality of communication with the mobile device 11 is poor, it may transmit the suggestion message 110 to the mobile device 11 so that, in response to the suggestion message 110, the mobile device 11 selects the BS 15a as the backup BS according to the service loading conditions and the measurements of the BSs 15a, 15b. Besides since the suggestion message 110 generated by the BS 13a or the backhaul network device 17 can also comprise the ID of the BS 15a, the mobile device 11, after receiving the suggestion message 110, can straightforwardly select the BS 15a as the backup BS without need to determine the backup BS according to the service loading conditions and the measurements of the BSs 15a, 15b. In other words, the operation of selecting the backup BS by the mobile device 11 may be activated by the mobile device 11 itself or activated in response to the suggestion message 110. In addition, generally, in order to avoid occurrence of any failure of the data transmission and to balance the service loading of individual BSs, no matter how the quality of communication with the primary BS is, the mobile device 11 would select a backup BS to establish another path for communication with the backhaul network device 17.

Figure 2A:
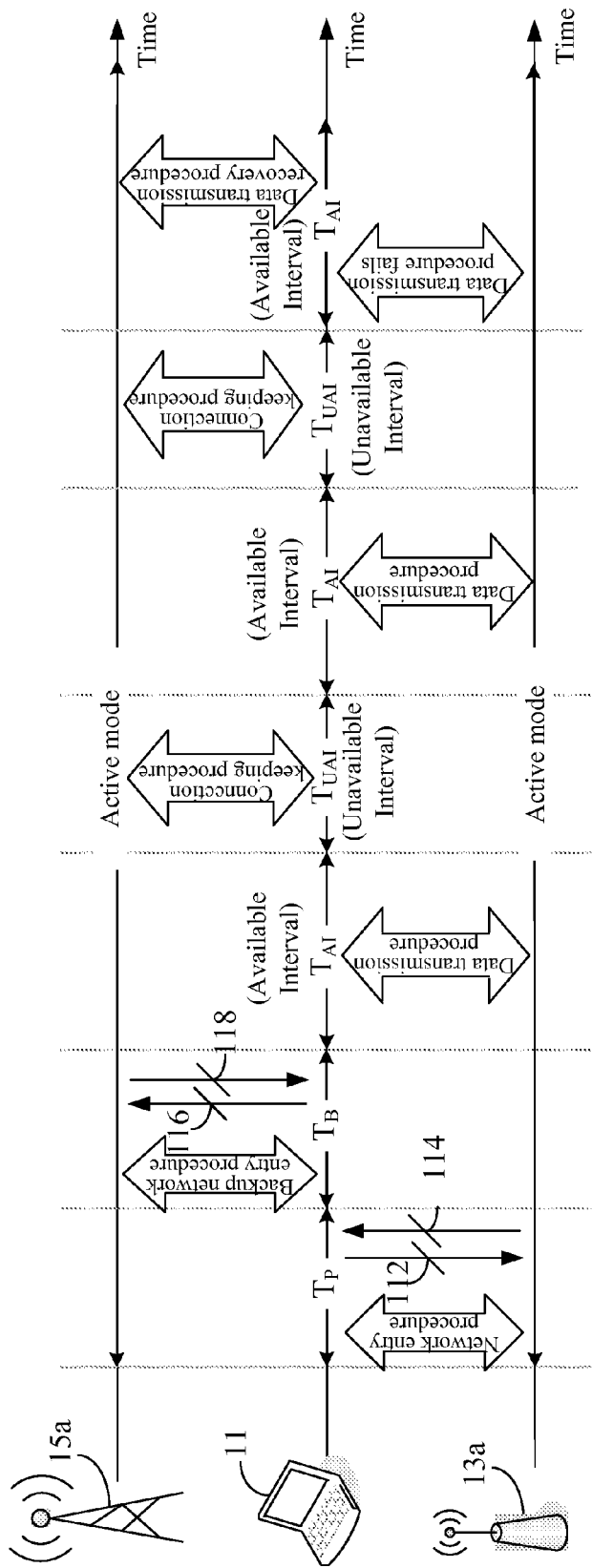
FIGS. 2A-2B are schematic timing diagrams of operations between a mobile device and a primary and a backup BS in the first example embodiment.

FIG. 2A is a schematic timing diagram of operations between the mobile device and the primary and the backup BSs. After the mobile device 11 has selected the BS 13a as the primary BS and selected, by itself, the BS 15a as the backup BS, the mobile device 11 performs the network entry procedure with the BS 13a during a time interval $T_P$. After completion of the network entry procedure, the mobile device 11 transmits a low-duty mode request signal 112 to the BS 13a to inform the BS 13a of the information that the mobile device 11 works in the low-duty mode during data transmission and of the ID of the BS 15a. After receiving the low-duty mode request signal 112, the BS 13a transmits a low-duty mode response signal 114 to the mobile device 11 during the time interval $T_P$ to provide the information that the BS 13a has been confirmed that the mobile device 11 works in the low-duty mode and also to provide parameters necessary for the mobile device 11 to work in the low-duty mode. Additionally, after the BS 13a learns from the low-duty mode request signal 112 that the mobile device 11 has selected the BS 15a as the backup BS, it further informs the BS 15a via the backhaul network device 17 in advance that the mobile device 11 is to perform the backup network entry procedure with the BS 15a, so as to provide information necessary for performing the backup network entry procedure.

It shall be noted that, if the BS 13a considers that another BS (e.g., the BS 15b) in the wireless network system 1 can provide better communication quality to the mobile device 11, the BS 13a may embed the ID of the BS 15b into the low-duty mode response signal 114 so that the mobile device 11 selects the BS 15b as the backup BS according to the low-duty mode response signal 114. In other words, the mobile device 11 may select the backup BS either by itself or according to determination of the BS 13a, the precedence order of which depends on the standard adopted by the wireless network system 1.

After having completed the connection setup procedure with the BS 13a during the time interval $T_P$, the mobile device 11 performs the backup network entry procedure with the BS 15a during the time interval $T_B$. After completion of the backup network entry procedure, the mobile device 11 transmits a low-duty mode notification signal 116 to the BS 15a so that the BS 15a is confirmed that the mobile device 11 works in a low-duty mode during data transmission, and the mobile device 11 is to perform a data transmission procedure with the BS 13a and is to perform only a connection keeping procedure with the BS 15a. Accordingly, the BS 15a only needs to allocate resources necessary for the connection keeping procedure to the mobile device 11. After receiving the low-duty mode notification signal 116, the BS 15a transmits a low-duty mode acknowledgement signal 118 to the mobile device 11 during the time interval $T_B$ so that the mobile device 11 learns from the low-duty mode acknowledgement signal 118 that the BS 15a has successfully received the low-duty mode notification signal 116.

Upon completion of the backup connection setup procedure with the BS 15a, the mobile device 11 enters into the low-duty mode immediately for data transmission. As shown in FIG. 2A, the low-duty mode comprises an available interval (AI) $T_{AI}$ and an unavailable interval (UAI) $T_{UAI}$. During the available interval $T_{AI}$, the mobile device 11 performs the data transmission procedure with the BS 13a to communicate with the backhaul network device 17 via the BS 13a for transmission of various data (e.g., real-time voice data, text data, video data and Internet data). Then, during the unavailable interval $T_{UAI}$, the mobile device 11 performs a connection keeping procedure with the BS 15a to ensure that the connection with the BS 15a will not be disconnected due to failure of the BS 15a to receive a response for a long time. For example, the mobile device 11 may transmit a keep-alive signal during the unavailable interval $T_{UAI}$ to make the BS 15a keep the connection with the mobile device 11.

When the mobile device 11 is communicating with the backhaul network device 17 via the BS 13a, if the data transmission procedure fails due to interference or due to an unpredictable failure of the BS 13a itself, the mobile device 11 will perform a data transmission recovery procedure with the BS 15a immediately to continuously communicate with the backhaul network device 17 via the BS 15a. As an example, during the data transmission recovery procedure, the mobile device 11 may transmit a service continuity request signal to the BS 15a so that the BS 15a transmits a service continuity notification signal to the backhaul network device 17 according to the service continuity request signal. Thereafter, the mobile device 11 resumes the communication with the backhaul network device 17 immediately via the BS 15a. Thus, the mobile device 11 can continue to transmit data, which are originally transmitted via the BS 13a, to and from the backhaul network device 17 via the BS 15a.

Furthermore, after completion of the network entry procedure performed between the mobile device 11 and the BS 13a, the BS 13a generates a network entry message 122 and transmits the network entry message 122 to the backhaul network device 17 so that the backhaul network device 17 establishes a data transmission path to the mobile device 11 according to the network entry message 122; and after completion of the backup network entry procedure performed between the mobile device 11 and the BS 15a, the BS 15a also generates a backup network entry message 124 and transmits the backup network entry message 124 to the backhaul network device 17 so that the backhaul network device 17 establishes a backup data transmission path to the mobile device 11 according to the backup network entry message 124. Therefore, in general cases, the mobile device 11 takes the data transmission path via the BS 13a (i.e., the Femtocell BS) as a path mainly used to communicate with the backhaul network device 17. When the communication between the mobile device 11 and the BS 13a fails, the mobile device 11 will immediately use the backup data transmission path via the BS 15a (i.e., a Macrocell BS, a Picocell BS, a Microcell BS or a relay BS) to communicate with the backhaul network device 17.

Figure 2B:
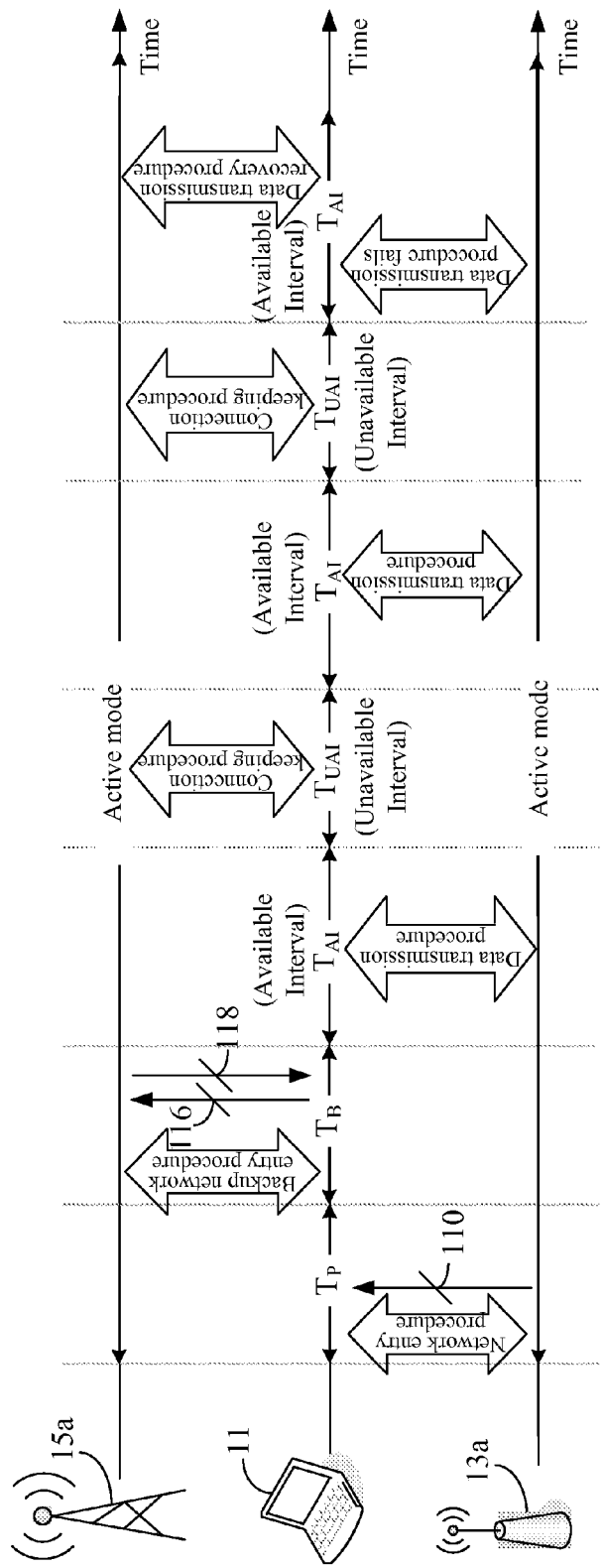

FIG. 2B is another schematic timing diagram of operations between the mobile device and the primary and the backup BSs. Unlike the timing diagram depicted in FIG. 2A, in FIG. 2B, the operation of selecting a backup BS is activated by the BS 13a or the backhaul network device 17. Hence, during the time interval $T_P$, the mobile device 11 only receives the suggestion message 110 from the BS 13a but does not transmit a low-duty mode request signal 112 to the BS 13a, nor will the BS 13a transmit a low-duty mode response signal 114 to the mobile device 11. In other words, in response to the suggestion message 110 generated by the BS 13a or the backhaul network device 17, the mobile device 11 selects the BS 15a as the backup BS according to the service loading conditions and the measurements of the BSs 15a, 15b, and retrieves parameters necessary for the mobile device 11 to work in the low-duty mode from the suggestion message 110. Then, the mobile device 11 can transmit a backup BS message comprising the ID of the BS 15a to the BS 13a directly so that the BS 13a learns from the backup BS message that the mobile device 11 has selected the BS 15a as the backup BS, and the BS 13a can inform the BS 15a via the backhaul network device 17 in advance that the mobile device 11 is to perform the backup network entry procedure with the BS 15a, so as to provide information necessary for the backup network entry procedure. However, it may also be that, after the mobile device 11 has established the backup data transmission path to the backhaul network device 17, the BS 13a learns from the backhaul network device 17 that the mobile device 11 has selected the BS 15a as the backup BS. Additionally, as described above, the suggestion information 110 may also comprise the ID of the BS 15a, in which case the mobile device 11 selects the BS 15a as the backup BS directly after receiving the suggestion information 110.

It shall be noted that, if the mobile device 11 considers that another BS (e.g., the BS 15b) in the wireless network system 1 can provide better communication quality, the mobile device 11 may simply ignore the suggestion message 110 and select, by itself, the BS 15b as the backup BS. In other words, the mobile device 11 may select the backup BS either by itself or according to determination of the BS 13a, the precedence order of which depends on the standard adopted by the wireless network system 1.

Next, internal architecture of the mobile device 11, the BSs 13a, 15a and the backhaul network device 17 will be described with reference to FIGS. 3A-3D and subsequent related descriptions. It shall be appreciated that, because the BS 13b is identical to the BS 13a in nature, and the BS 15b is identical to the BS 15a in nature, only internal architecture of the BSs 13a and 15a will be described herein.

Figure 3A:
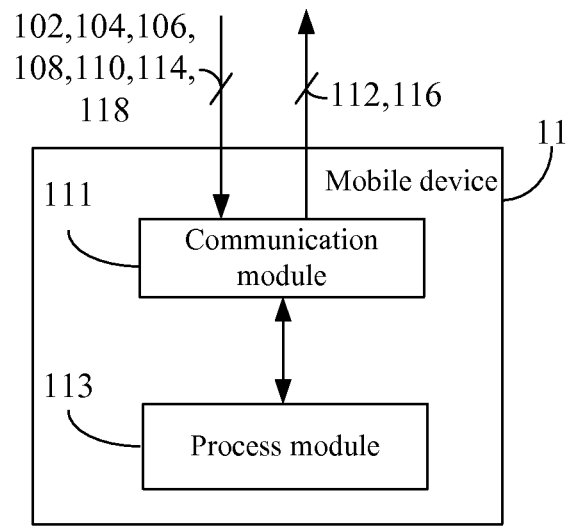
FIGS. 3A-3D are schematic views of a mobile device, a primary BS, a backup BS and a backhaul network device of the present invention respectively.

Firstly, referring to FIG. 3A, the mobile device 11 comprises a communication module 111 and a process module 113. The communication module 111 is configured to receive the BS information 102, 104, 106, 108 from the BSs 13a, 13b, 15a, 15b. The process module 113 is electrically connected to the communication module 111, and is configured to select the BS 13a from the BSs 13a, 13b as the primary BS and select the BS 15a from the BSs 15a, 15b as the backup BS according to the BS information 102, 104, 106, 108.

Additionally, the communication module 111 is further configured to perform the network entry procedure with the BS 13a, and perform the backup network entry procedure with the BS 15a. After completion of the network entry procedure, the communication module 111 transmits the low-duty mode request signal 112 to the BS 13a to provide the information that the mobile device 11 works in the low-duty mode during the data transmission and also provide the ID of the BS 15a; and the communication module 111 receives the low-duty mode response signal 114 from the BS 13a to obtain the information that the BS 13a has confirmed that the mobile device 11 works in the low-duty mode and also to obtain parameters necessary for the mobile device 11 to work in the low-duty mode. When the mobile device 11 selects the backup BS in response to the suggestion message 110, the communication module 111 is configured to receive the suggestion information 110. Furthermore, after the backup network entry procedure, the communication module 111 transmits the low-duty mode notification signal 116 to the BS 15a so that the BS 15a confirms that the mobile device 11 works in the low-duty mode during the data transmission, and the mobile device 11 is to perform the data transmission procedure with the BS 13a and is to perform only the connection keeping procedure with the BS 15a. Thereafter, the communication module 111 further receives the low-duty mode acknowledgement signal 118 from the BS 15a.

The communication module 111 performs the data transmission procedure with the BS 13a during the available interval $T_{AI}$ to communicate with the backhaul network device 17 via the BS 13a, and performs the connection keeping procedure with the BS 15a during the unavailable interval $T_{UAI}$. When determining that the data transmission procedure fails due to interference or due to an unpredictable failure of the BS 13a itself, the process module 113 will immediately enable the communication module 111 to perform the data transmission recovery procedure with the BS 15a. Then, the communication module 111 communicates with the backhaul network device 17 via the BS 15a.

Figure 3B:
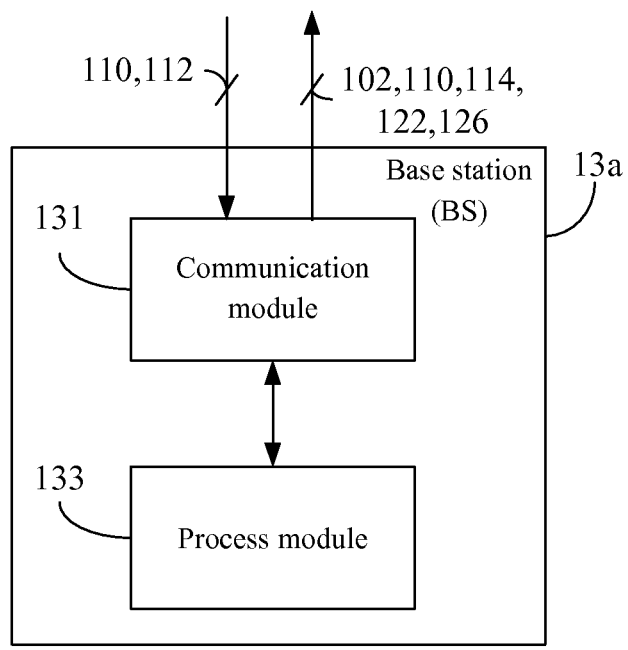

Further referring to FIG. 3B, the BS 13a comprises a communication module 131 and a process module 133. The communication module 131 is configured to transmit the BS information 102 to the mobile device 11, and perform the network entry procedure with the mobile device 11. After completion of the network entry procedure, the communication module 131 receives the low-duty mode request signal 112 from the mobile device 11 and transmits the low-duty mode response signal 114 to the mobile device 11. When the operation of selecting the backup BS by the mobile device 11 is activated by the BS 13a, the process module 133 is configured to generate the suggestion message 110 and enable the communication module 131 to transmit the suggestion message 110 to the mobile device 11. However, when the operation of selecting the backup BS by the mobile device 11 is activated by the backhaul network device 17, the communication module 131 will receive the suggestion message 110 from the backhaul network device 17 and transmit the suggestion message 110 to the mobile device 11.

The process module 133 is electrically connected to the communication module 131. After completion of the network entry procedure, the process module 133 generates the network entry message 122 and enables the communication module 131 to transmit the network entry message 122 to the backhaul network device 17 so that the backhaul network device 17 establishes the data transmission path to the mobile device 11 according to the network entry message 122. Furthermore, the communication module 131 performs the data transmission procedure with the mobile device 11 during the available interval $T_{AI}$ so as to make the mobile device 11 communicate with the backhaul network device 17.

Figure 3C:
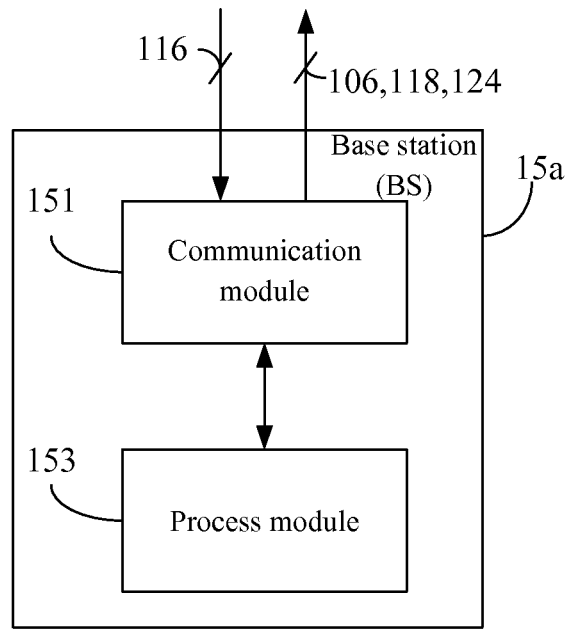

Further referring to FIG. 3C, the BS 15a comprises a communication module 151 and a process module 153. The communication module 151 is configured to perform the backup network entry procedure with the mobile device 11, and receive the low-duty mode notification signal 116 from the mobile device 11 and transmit the low-duty mode acknowledgement signal 118 to the mobile device 11. The process module 153 is electrically connected to the communication device 151. After completion of the backup network entry procedure, the process module 153 generates the backup network entry message 124 and enables the communication module 151 to transmit the backup network entry message 124 to the backhaul network device 17. The communication module 151 performs the connection keeping procedure with the mobile device 11 during the unavailable interval $T_{UAI}$. Furthermore, after the data transmission procedure between the mobile device 11 and the BS 13a fails, the communication module 151 is further configured to perform the data transmission recovery procedure with the BS 15a so as to make the mobile device 11 communicate with the backhaul network device 17 via the communication module 151.

Figure 3D:
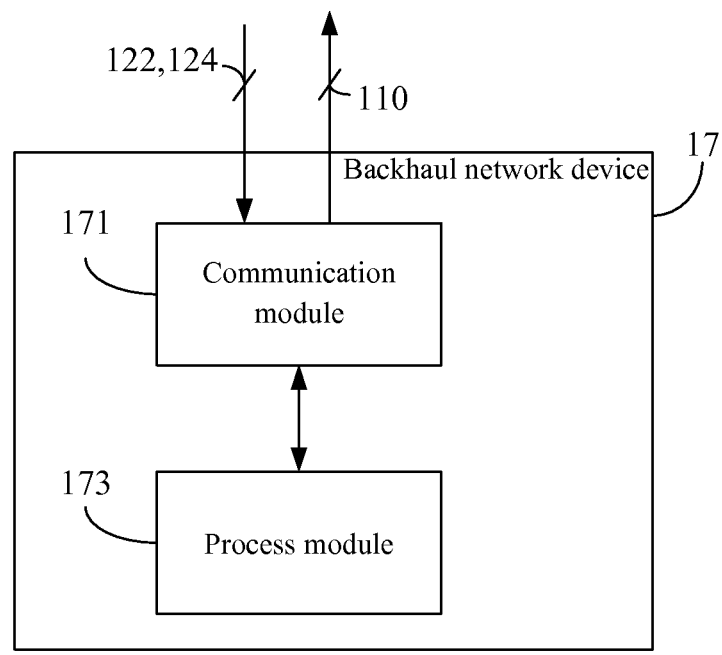

Further referring to FIG. 3D, the backhaul network device 17 comprises a communication module 171 and a process module 173. The communication module 171 is configured to receive the network entry message 122 and the backup network entry message 124 from the BSs 13a and 15a. The process module 173 is electrically connected to the communication module 171, and configured to establish the data transmission path to the mobile device 11 according to the network entry message 122 and establish the backup data transmission path to the mobile device 11 according to the backup network entry message 124. When the operation of selecting the backup BS by the mobile device 11 is activated by the backhaul network device 17, the process module 173 is further configured to generate the suggestion message 110 and enable the communication module 171 to transmit the suggestion message 110 to the BS 13a so as to transmit the suggestion message 110 to the mobile device 11 via the BS 13a.

When the mobile device 11 performs the data transmission procedure with the BS 13a during the available interval $T_{AI}$, the communication module 171 communicates with the mobile device 11 via the BS 13a; and after the mobile device 11 has performed the data transmission recovery procedure with the BS 15a, the communication module 171 continuously communicates with the mobile device 11 via the BS 15a.

Figure 4A:
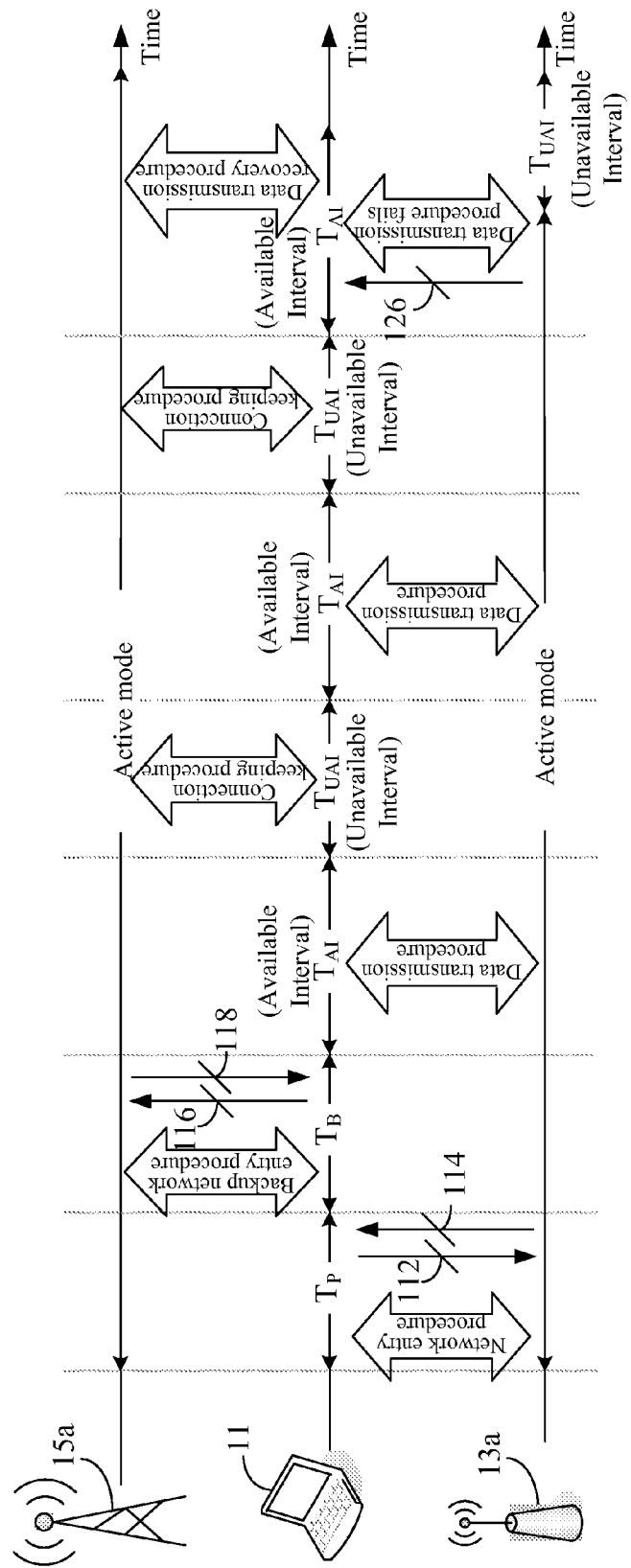
FIGS. 4A-4B are schematic timing diagrams of operations between a mobile device and a primary and a backup BS in a second example embodiment.
Figure 4B:
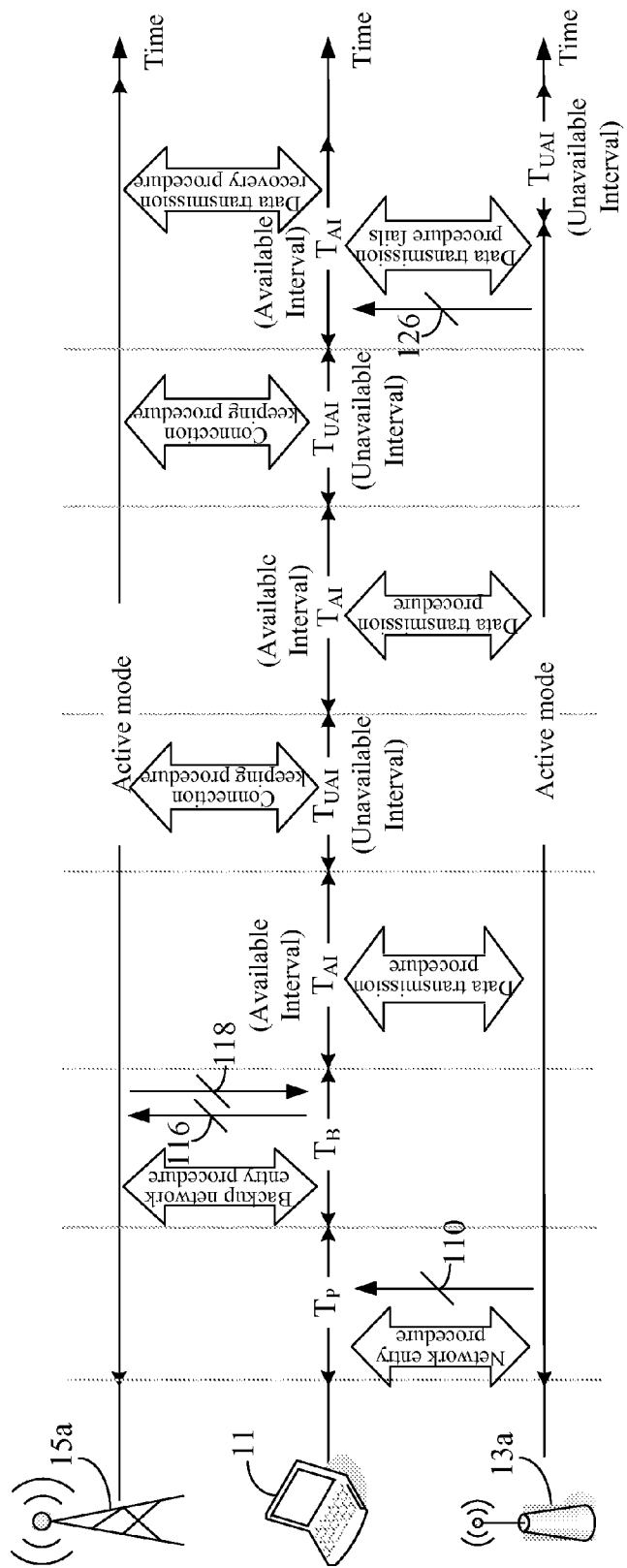

A second example embodiment of the present invention is as depicted in FIG. 4A and FIG. 4B. Unlike the first example embodiment, in the second example embodiment, failure of the data transmission procedure between the mobile device 11 and the BS 13a is predictable. In other words, in the second example embodiment, when the BS 13a is to cease communication services or to switch from the active mode to the low-duty mode during the data transmission, the BS 13a transmits a communication interruption signal 126 to the mobile device 11. Thus, the mobile device 11 can learn from the communication interruption signal 126 that the data transmission procedure is to fail, and begin to perform the data transmission recovery procedure with the BS 15a.

Further speaking, when the BS 13a is to cease communication services, the process module 133 enables the communication module 131 to transmit the communication interruption signal 126 to the mobile device 11. Then, after the communication module 111 of the mobile device has received the communication interruption signal 126 from the BS 13a, the process module 113 determines that the data transmission procedure fails according to the communication interruption signal 126, and enables the communication module 111 to perform the data transmission recovery procedure with the BS 15a.

Figure 5A:
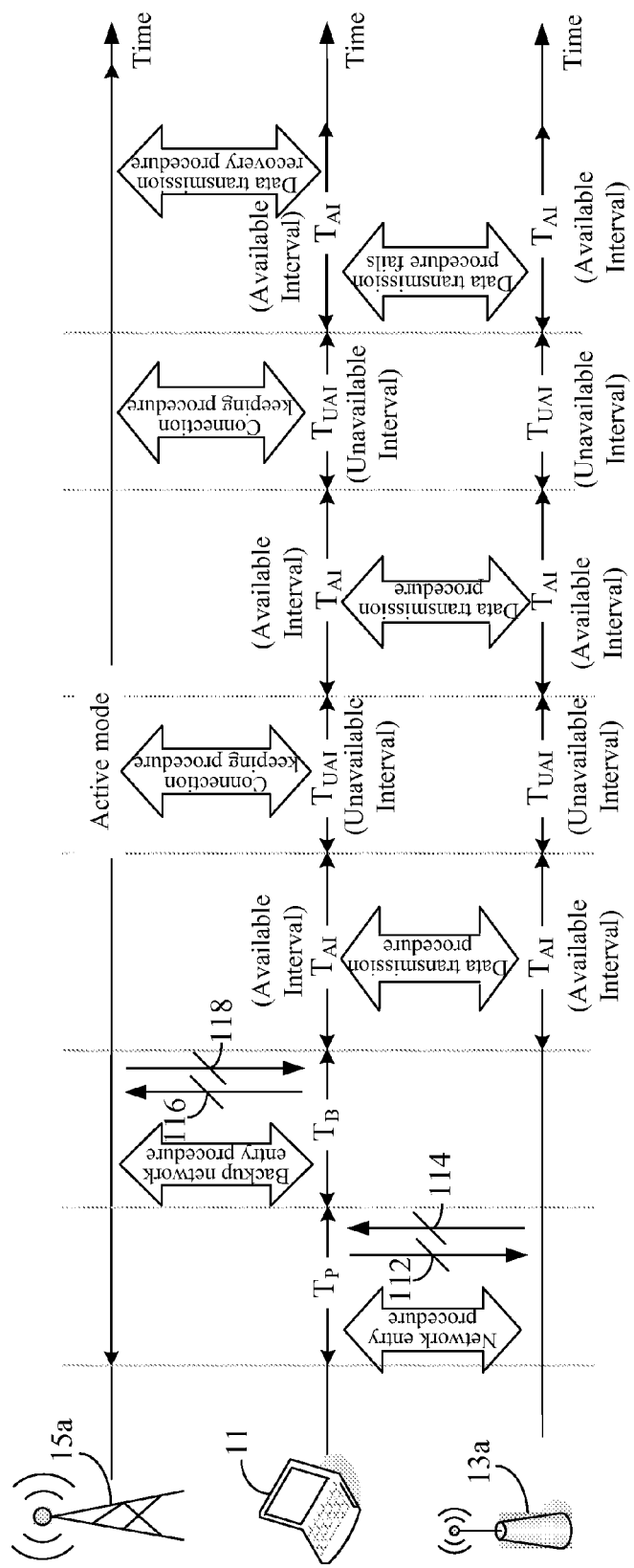
FIGS. 5A-5B are schematic timing diagrams of operations between a mobile device and a primary and a backup BS in a third example embodiment.
Figure 5B:
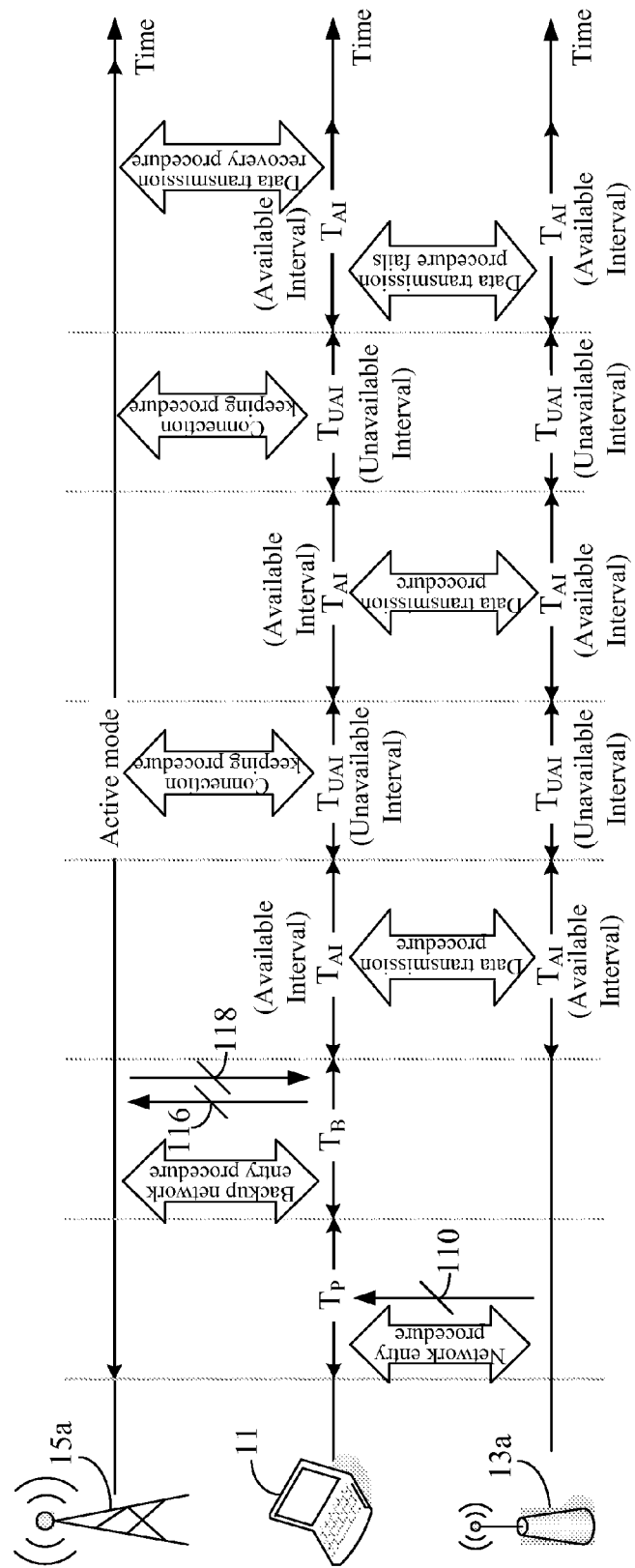

A third example embodiment of the present invention is as depicted in FIG. 5A and FIG. 5B. Unlike the first example embodiment, in the third example embodiment, the BS 13a also works in the low-duty mode during the data transmission. Similarly, failure of the data transmission procedure may be either unpredictable (as described in the first example embodiment) or predictable (as described in the second example embodiment), thus this will not be further described herein.

Figure 6:
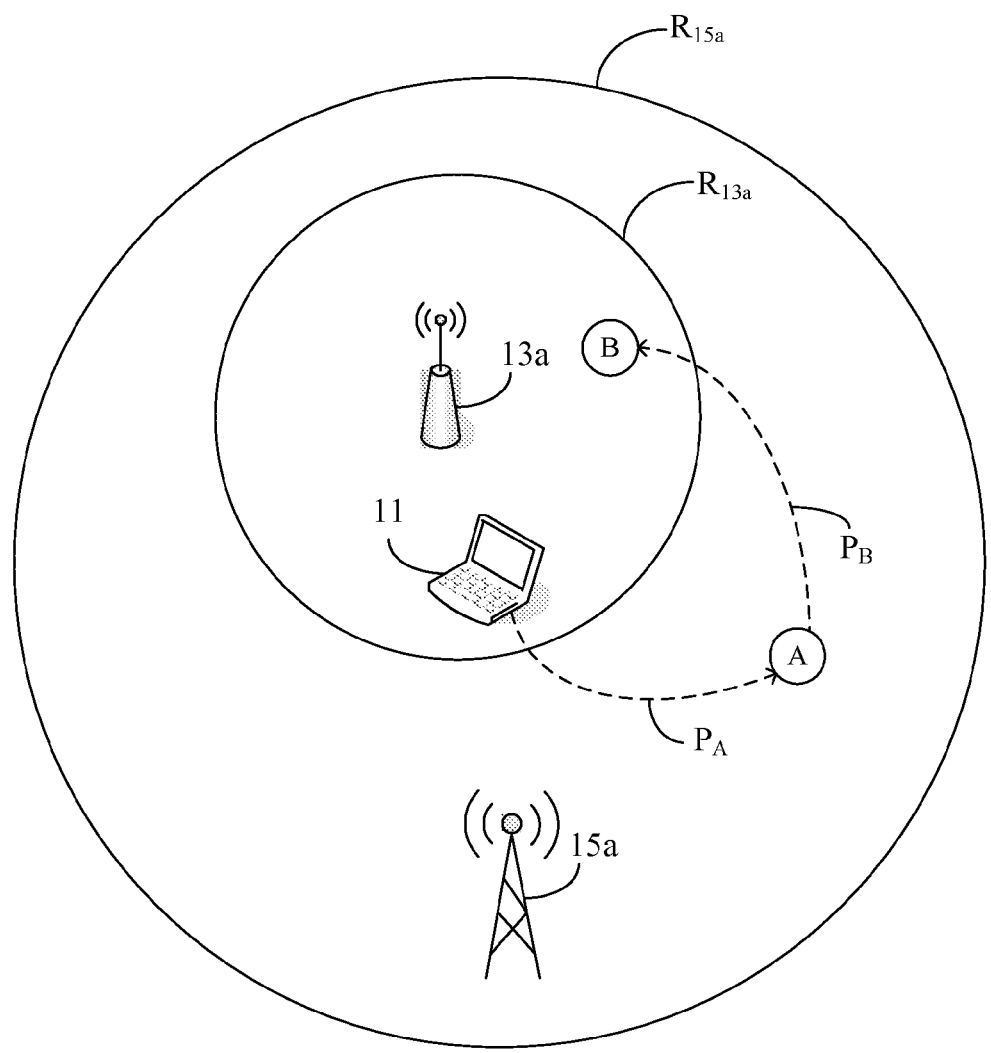
FIG. 6 is a schematic view of a fourth example embodiment of the present invention.

A fourth example embodiment of the present invention is as depicted in FIG. 6. Unlike the first example embodiment, in the fourth example embodiment, failure of the data transmission procedure between the mobile device 11 and the BS 13a is due to that the mobile device 11 moves out of signal coverage $R_{13a}$ of the BS 13a. For example, when moving away from the signal coverage $R_{13a}$ of the BS 13a to a location A along a path $P_A$, the mobile device 11 is located within only signal coverage $R_{15a}$ of the BS 15a. Therefore, the mobile device 11 will perform the data transmission recovery procedure with the BS 15a immediately so as to communicate with the backhaul network device 17 through the backup data transmission path.

After the mobile device 11 has moved out of the signal coverage $R_{13a}$, the BS 13a still retains a transmission resource necessary for the mobile device 11. Therefore, when moving to a location B along a path $P_B$ and re-entering into the signal coverage $R_{13a}$, the mobile device 11 can communicate with the backhaul network device 17 via the BS 13a again without need to re-perform the network entry procedure. Additionally, the mobile device 11 also continues to perform the connection keeping procedure with the BS 15a. As the mobile device 11 moves out of the signal coverage $R_{13a}$, the process module 113 of the mobile device 11 determines that the data transmission procedure fails, so it enables the communication module 111 to perform the data transmission recovery procedure with the BS 15a. Thereafter, when the mobile device 11 re-enters into the signal coverage $R_{13a}$, the process module 113 enables the communication module 111 to re-perform the data transmission procedure with the BS 13a and re-perform the connection keeping procedure with the BS 15a.

Figure 7:
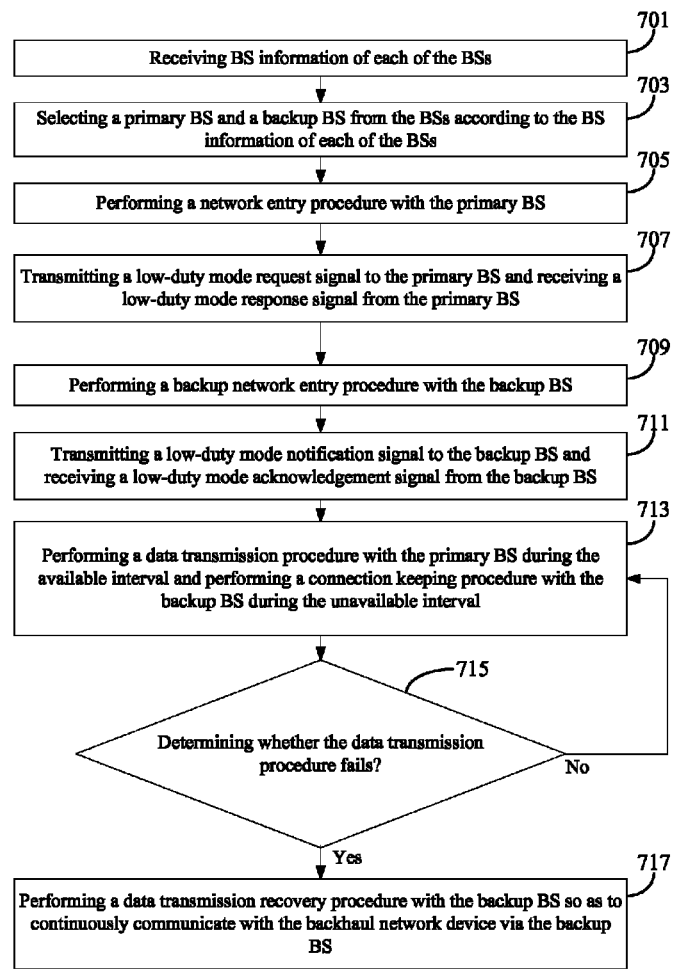
FIG. 7 is a flowchart of a fifth example embodiment of the present invention.

As shown in FIG. 7, a fifth example embodiment of the present invention is a method for a mobile device of a wireless network system. The method is adapted for the mobile device 11 described in the first, the second, the third and the fourth example embodiments. The wireless network system comprises a mobile device, a plurality of BSs and a backhaul network device. Each of the BSs is connected to the backhaul network device either directly or indirectly through a wired or wireless connection. The mobile device works, during data transmission, in a low-duty mode comprising an available interval and an unavailable interval.

Specifically, the method described in the fifth example embodiment may be implemented by a computer program storage product. The computer program storage product comprises a computer readable medium being a non-transitory signal and storing a program of the method for the mobile device. When the program is loaded into the mobile device and a plurality of codes comprised in the program is executed, the method described in the fifth example embodiment can be accomplished. The aforesaid computer readable medium may be a read only memory (ROM), a flash memory, a floppy disk, a hard disk, a compact disk, a mobile disk, a magnetic tape, a database accessible to networks, or any other storage medium with the same function and well known to those skilled in the art.

Firstly, step 701 is executed to enable a communication module of the mobile device to receive BS information of each of the BSs from each of the BSs respectively so as to obtain service loading conditions of each of the BSs and signal measurements such as an RSSI, an SINR and a CINR relative to each of the BSs according to each of the BS information. Then, step 703 is executed to enable a process module of the mobile device to select a primary BS and a backup BS from the BSs according to the BS information of each of the BSs, and step 705 is executed to enable the communication module of the mobile device to perform a network entry procedure with the primary BS. Afterwards, step 707 is executed to enable the communication module of the mobile device to transmit a low-duty mode request signal to the primary BS, so as to provide the primary BS with the information that the mobile device works in the low-duty mode during data transmission and the ID of the backup BS and receive a low-duty mode response signal from the primary BS. The low-duty mode response signal comprises the information that the primary BS has confirmed that the mobile device works in the low-duty mode and also comprises parameters necessary for the mobile device to work in the low-duty mode.

Through the steps 705 and 707, the mobile device accomplishes the connection setup procedure with the primary BS. Then, step 709 is executed to enable the communication module of the mobile device to perform a backup network entry procedure with the backup BS. Thereafter, step 711 is executed to enable the communication module of the mobile device to transmit a low-duty mode notification signal to the backup BS so that the backup BS confirms that the mobile device works in a low-duty mode during data transmission, and the mobile device is to perform a data transmission procedure with the primary BS and is to perform only a connection keeping procedure with the backup BS. Accordingly, the backup BS only needs to allocate resources necessary for the connection keeping procedure to the mobile device. Thereafter, the communication module of the mobile device further receives a low-duty mode acknowledgement signal from the backup BS. Thus, the mobile device accomplishes the connection setup procedure with the backup BS.

Thereafter, step 713 is executed to enable the communication module of the mobile device to perform the data transmission procedure with the primary BS during the available interval so as to communicate with the backhaul network device via the primary BS, and to perform the connection keeping procedure with the backup BS during the unavailable interval. Step 715 is executed to enable the process module of the mobile device to determine whether the data transmission procedure fails when communicating with the backhaul network device via the primary BS. If the data transmission procedure does not fail, then the method proceeds to the step 713. Otherwise, if the data transmission procedure fails, then step 717 is executed to enable the communication module of the mobile device to perform a data transmission recovery procedure with the backup BS so as to communicate with the backhaul network device via the backup BS continuously.

It shall be appreciated that, in the step 717, failure of the data transmission procedure may be, as described in the first embodiment, due to interference or due to an unpredictable failure of the primary BS; or may be, as described in the second example embodiment, due to the communication interruption signal transmitted by the primary BS, in which case the mobile device knows that the data transmission is to fail. Furthermore, failure of the data transmission procedure may further be, as described in the fourth example embodiment, due to that the mobile device moves out of the signal coverage of the primary BS. However, the types of failure conditions of the data transmission procedure are not intended to limit the present invention, and any conditions that may cause failure of the data transmission procedure in the present invention will be readily appreciated by those of ordinary skill in the art and, thus, will not be further described herein.

In addition to the aforesaid steps, the fifth example embodiment can also execute all the operations and functions set forth in the first, the second, the third and the fourth example embodiments. How the method for a mobile device of the present invention executes these operations and functions will be readily appreciated by those of ordinary skill in the art based on the explanation of the first, the second, the third and the fourth embodiments and, thus, will not be further described herein.

Figure 8:
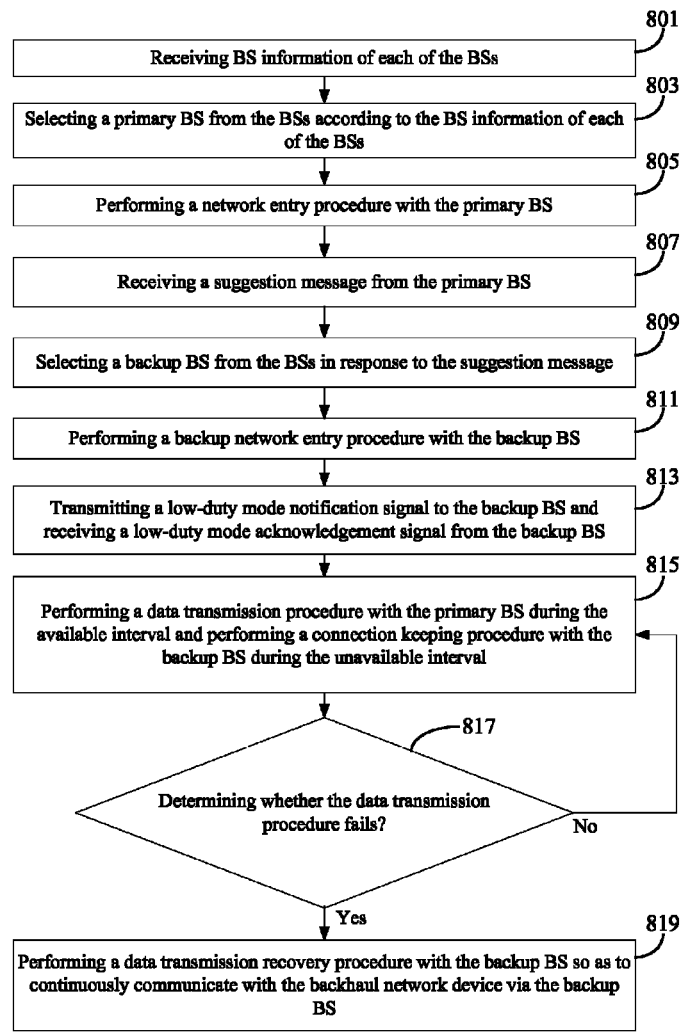
FIG. 8 is a flowchart of a sixth example embodiment of the present invention.

As shown in FIG. 8, a sixth example embodiment of the present invention is a method for a mobile device of a wireless network system. The method is adapted for the mobile device 11 described in the first, the second, the third and the fourth example embodiments. The wireless network system comprises a mobile device, a plurality of BSs and a backhaul network device. Each of the BSs is connected to the backhaul network device either directly or indirectly through a wired or wireless connection. The mobile device works, during data transmission, in a low-duty mode comprising an available interval and an unavailable interval.

Specifically, the method described in the sixth example embodiment may be implemented by a computer program storage product. The computer program storage product comprises a computer readable medium being a non-transitory signal and storing a program of the method for the mobile device. When the program is loaded into the mobile device and a plurality of codes comprised in the program is executed, the method described in the sixth example embodiment can be accomplished. The computer readable medium may be a ROM, a flash memory, a floppy disk, a hard disk, a compact disk, a mobile disk, a magnetic tape, a database accessible to networks, or any other storage medium with the same function and well known to those skilled in the art.

Firstly, step 801 is executed to enable a communication module of the mobile device to receive BS information of each of the BSs from each of the BSs respectively so as to obtain service loading conditions of each of the BSs and signal measurements such as an RSSI, an SINR and a CINR relative to each of the BSs according to the BS information. Then, step 803 is executed to enable a process module of the mobile device to select a primary BS from the BSs according to the BS information of each of the BSs, and step 805 is executed to enable the communication module of the mobile device to perform a network entry procedure with the primary BS. Afterwards, step 807 is executed to enable the communication module of the mobile device to receive a suggestion message from the primary BS, wherein the suggestion message comprises parameters necessary for the mobile device to work in a low-duty mode.

Through the steps 805 and 807, the mobile device accomplishes the connection setup procedure with the primary BS. Then, step 809 is executed to enable the process module of the mobile device to select a backup BS from the BSs in response to the suggestion message. If the suggestion message comprises an ID of a BS, then the process module of the mobile device directly selects the BS as the backup BS according to the ID of the BS. Otherwise, if the suggestion message does not comprise any ID of a BS, then, in response to the suggestion message, the process module of the mobile device selects the backup BS from the BSs according to the BS information of each of the BSs.

Thereafter, step 811 is executed to enable the communication module of the mobile device to perform a backup network entry procedure with the backup BS. Then, step 813 is executed to enable the communication module of the mobile device to transmit a low-duty mode notification signal to the backup BS so that the backup BS confirms that the mobile device works in a low-duty mode during data transmission, and the mobile device is to perform a data transmission procedure with the primary BS and is to perform only a connection keeping procedure with the backup BS. Accordingly, the backup BS only needs to allocate resources necessary for the connection keeping procedure to the mobile device. Thereafter, the communication module of the mobile device further receives a low-duty mode acknowledgement signal from the backup BS. Thus, the mobile device accomplishes the connection setup procedure with the backup BS.

Thereafter, step 815 is executed to enable the communication module of the mobile device to perform a data transmission procedure with the primary BS during the available interval so as to communicate with the backhaul network device via the primary BS, and perform a connection keeping procedure with the backup BS during the unavailable interval. Step 817 is executed to enable the process module of the mobile device to determine whether the data transmission procedure fails when communicating with the backhaul network device via the primary BS. If the data transmission procedure does not fail, then the method proceeds to the step 815. Otherwise, if the data transmission procedure fails, then step 819 is executed to enable the communication device of the mobile device to perform a data transmission recovery procedure with the backup BS so as to continuously communicate with the backhaul network device via the backup BS.

It shall be appreciated that, in the step 819, failure of the data transmission procedure may be, as described in the first example embodiment, due to interference or due to an unpredictable failure of the primary BS; or may be, as described in the second example embodiment, due to the communication interruption signal transmitted by the primary BS, in which case the mobile device knows that the data transmission is to fail. Furthermore, failure of the data transmission procedure may further be, as described in the fourth example embodiment, due to that the mobile device moves out of the signal coverage of the primary BS. However, the types of failure conditions of the data transmission procedure are not intended to limit the present invention, and any conditions that may cause failure of the data transmission procedure in the present invention will be readily appreciated by those of ordinary skill in the art and, thus, will not be further described herein.

In addition to the aforesaid steps, the sixth example embodiment can also execute all the operations and functions set forth in the first, the second, the third and the fourth example embodiments. How the method for a mobile device of the present invention executes these operations and functions will be readily appreciated by those of ordinary skill in the art based on the explanation of the first, the second, the third and the fourth example embodiments and, thus, will not be further described herein.

According to the above descriptions, the mobile device of the present invention can select a primary BS and a backup BS from a plurality of BSs, and can establish a data transmission path and a backup data transmission path to the backhaul network device via the primary BS and the backup BS respectively. Thus, after the data transmission through the data transmission path between the mobile device and the primary BS fails, the mobile device can communicate with the backhaul network device via the backup BS through the backup data transmission path instead. Accordingly, the wireless network system of the present invention can address the deficiencies of the prior art that, when data transmission between a mobile device and a BS fails, the mobile device has to find another BS to re-perform a network entry procedure to cause discontinuity and/or delay of the data transmission.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above example descriptions, they have substantially been covered in the following claims as appended.

What is claimed is:

1. A mobile device for a wireless network system, the wireless network system comprising the mobile device, a plurality of base stations (BSs) and a backhaul network device, each of the BSs is connected to the backhaul network device, the mobile device working in a low-duty mode periodically comprising a preconfigured available interval and a preconfigured unavailable interval, the mobile device comprising:
a communication module, being configured to receive BS information of each of the BSs, the BS information of each of the BSs comprising a service loading condition; and
a process module, being electrically connected to the communication module, and configured to select a primary BS and a backup BS from the BSs according to the BS information of each of the BSs,
wherein the communication module is configured to perform a data transmission procedure with the primary BS during the preconfigured available interval to communicate with the backhaul network device via the primary BS, and perform a connection keeping procedure with the backup BS during the preconfigured unavailable interval; and
wherein when the communication module communicates with the backhaul network device via the primary BS, the process module is further configured to determine that the data transmission procedure fails and enable the communication module to perform a data transmission recovery procedure with the backup BS so that the communication module continuously communicates with the backhaul network device via the backup BS.

2. The mobile device as claimed in claim 1, wherein the communication module is further configured to perform a network entry procedure with the primary BS and perform a backup network entry procedure with the backup BS.

3. The mobile device as claimed in claim 2, wherein after completion of the network entry procedure, the communication module receives a suggestion message from the backhaul network device via the primary BS, and the process module selects the backup BS from the BSs in response to the suggestion message.

4. The mobile device as claimed in claim 2, wherein after completion of the network entry procedure, the communication module receives a suggestion message from the primary BS, and the process module selects the backup BS from the BSs in response to the suggestion message.

5. The mobile device as claimed in claim 1, wherein the communication module is further configured to transmit a low-duty mode request signal to the primary BS, and the low-duty mode request signal comprises information that the mobile device works in the low-duty mode and also comprises an identification (ID) of the backup BS.

6. The mobile device as claimed in claim 1, wherein the communication module is further configured to transmit a low-duty mode notification signal to the backup BS so that the backup BS is confirmed that: the mobile device works in the low-duty mode, and the mobile device is to perform the data transmission procedure with the primary BS and is to perform the connection keeping procedure with the backup BS.

7. The mobile device as claimed in claim 1, wherein the communication module is configured to receive a communication interruption signal from the primary BS, and the process module is configured to determine that the data transmission procedure fails according to the communication interruption signal.

8. The mobile device as claimed in claim 1, wherein the primary BS has signal coverage, and when the mobile device moves out of the signal coverage of the primary BS, the process module determines that the data transmission procedure fails.

9. A primary BS for a wireless network system, the wireless network system comprising a mobile device, a plurality of BSs and a backhaul network device, each of the BSs being connected to the backhaul network device and the primary BS being one of the BSs, the mobile device being configured to select the primary BS and a backup BS from the BSs according to BS information of each of the BSs, the BS information of each of the BSs comprising a service loading condition, the mobile device working in a low-duty mode periodically comprising a preconfigured available interval and a preconfigured unavailable interval, the primary BS comprising:
a communication module, being configured to perform a data transmission procedure with the mobile device during the preconfigured available interval so that the mobile device communicates with backhaul network device via the primary BS,
wherein the mobile device is configured to perform a connection keeping procedure with the backup BS during the preconfigured unavailable interval, and when communicating with the backhaul network device via the primary BS and determining that the data transmission procedure fails, the mobile device performs a data transmission recovery procedure with the backup BS so as to continuously communicate with the backhaul network device via the backup BS.

10. The primary BS as claimed in claim 9, wherein the communication module is further configured to perform a network entry procedure with the mobile device.

11. The primary BS as claimed in claim 10, wherein the primary BS further comprises a process module electrically connected to the communication module, and after completion of the network entry procedure, the process module generates a network entry message and enables the communication module to transmit the network entry message to the backhaul network device so that the backhaul network device establishes a data transmission path to the mobile device according to the network entry message.

12. The primary BS as claimed in claim 10, wherein the primary BS further comprises a process module electrically connected to the communication module, and after completion of the network entry procedure, the process module generates a suggestion message and enables the communication module to transmit the suggestion message to the mobile device so that the mobile device selects the backup BS from the BSs in response to the suggestion message.

13. The primary BS as claimed in claim 10, wherein after completion of the network entry procedure, the communication module receives a suggestion message from the backhaul network device and routes the suggestion message to the mobile device so that the mobile device selects the backup BS in response to the suggestion message.

14. The primary BS as claimed in claim 10, further comprising a process module electrically connected to the communication module, wherein the communication module is configured to receive a low-duty mode request signal from the mobile device, the low-duty mode request signal comprises information that the mobile device works in the low-duty mode and an ID of the backup BS, and the communication module is further configured to transmit the low-duty mode request signal to the process module so that the process module is confirmed that the mobile device works in the low-duty mode and also confirmed of the ID of the backup BS.

15. A backup BS for a wireless network system, the wireless network system comprising a mobile device, a plurality of BSs and a backhaul network device, each of the BSs being connected to the backhaul network device and the backup BS being one of the BSs, the mobile device being configured to select a primary BS and the backup BS from the BSs according to BS information of each of the BSs, the BS information of each of the BSs comprising a service loading condition, the mobile device working in a low-duty mode periodically comprising a preconfigured available interval and a preconfigured unavailable interval, the backup BS comprising:
    a communication module, being configured to perform a connection keeping procedure with the mobile device during the preconfigured unavailable interval,
    wherein the mobile device is configured to perform a data transmission procedure with the primary BS during the preconfigured available interval so as to communicate with the backhaul network device via the primary BS, and when the mobile device communicates with the backhaul network device via the primary BS and determines that the data transmission procedure fails, the communication module performs a data transmission recovery procedure with the mobile device so that the mobile device continuously communicates with the backhaul network device via the backup BS.

16. The backup BS as claimed in claim 15, wherein the communication module is further configured to perform a backup network entry procedure with the mobile device.

17. The backup BS as claimed in claim 16, wherein the backup BS further comprises a process module electrically connected to the communication module, and after completion of the backup network entry procedure, the process module generates a backup network entry message and enables the communication module to transmit the backup network entry message to the backhaul network device so that the backhaul network device establishes a backup data transmission path to the mobile device according to the backup network entry message.

18. The backup BS as claimed in claim 15, further comprising a process module, wherein the communication module is configured to receive a low-duty mode notification signal from the mobile device, the low-duty mode notification signal comprises information that: the mobile device works in the low-duty mode, and the mobile device is to perform the data transmission procedure with the primary BS and is to perform the connection keeping procedure with the backup BS, and the communication module is further configured to transmit the low-duty mode notification signal to the process module so that the process module is confirmed that the mobile device works in the low-duty mode.

19. A backhaul network device for a wireless network system, the wireless network system comprising a mobile device and a plurality of BSs, each of the BSs being connected to the backhaul network device, the mobile device being configured to select a primary BS and a backup BS from the BSs according to BS information of each of the BSs, the BS information of each of the BSs comprising a service loading condition, the mobile device working in a low-duty mode periodically comprising a preconfigured available interval and a preconfigured unavailable interval, the backhaul network device comprising:
    a communication module, being configured to communicate with the mobile device via the primary BS when the mobile device performs a data transmission procedure with the primary BS during the preconfigured available interval,
    wherein the mobile device is configured to perform a connection keeping procedure with the backup BS during the preconfigured unavailable interval, and when the communication module communicates with the mobile device via the primary BS and the mobile device determines that the data transmission procedure fails, the mobile device performs a data transmission recovery procedure with the backup BS so that the communication module continuously communicates with the mobile device via the backup BS.

20. The backhaul network device as claimed in claim 19, wherein the backhaul network device further comprises a process module electrically connected to the communication module, and after the primary BS has performed a network entry procedure with the mobile device, the communication module receives a network entry message from the primary BS and the process module establishes a data transmission path to the mobile device according to the network entry message.

21. The backhaul network device as claimed in claim 19, wherein the backhaul network device further comprises a process module electrically connected to the communication module, and after the backup BS has performed a backup network entry procedure with the mobile device, the communication module receives a backup network entry message from the backup BS and the process module establishes a backup data transmission path to the mobile device according to the backup network entry message.

22. The backhaul network device as claimed in claim 19, wherein the backhaul network device further comprises a process module electrically connected to the communication module, the process module is configured to generate a suggestion message, and the communication module is configured to transmit the suggestion message to the mobile device via the primary BS so that the mobile device selects the backup BS from the BSs in response to the suggestion message.

23. A method for a mobile device of a wireless network system, the wireless network system comprising a plurality of BSs and a backhaul network device, each of the BSs being connected to the backhaul network device, the mobile device working in a low-duty mode periodically comprising a preconfigured available interval and a preconfigured unavailable interval, the method comprising the following steps of:
    receiving BS information of each of the BSs, the BS information of each of the BSs comprising a service loading condition;

selecting a primary BS and a backup BS from the BSs according to the BS information of each of the BSs;

performing a data transmission procedure with the primary BS during the preconfigured available interval to communicate with the backhaul network device via the primary BS;

performing a connection keeping procedure with the backup BS during the preconfigured unavailable interval;

when communicating with the backhaul network device via the primary BS, determining that the data transmission procedure fails; and performing a data transmission recovery procedure with the backup BS so as to continuously communicate with the backhaul network device via the backup BS.

24. The method as claimed in claim 23, further comprising the following steps of:

performing a network entry procedure with the primary BS; and performing a backup network entry procedure with the backup BS.

25. The method as claimed in claim 24, further comprising the following steps of:

after completion of the network entry procedure, receiving a suggestion message from the backhaul network device via the primary BS; and selecting the backup BS from the BSs in response to the suggestion message.

26. The method as claimed in claim 24, further comprising the following steps of:

after completion of the network entry procedure, receiving a suggestion message from the primary BS; and selecting the backup BS from the BSs in response to the suggestion message.

27. The method as claimed in claim 23, further comprising the following step of:

transmitting a low-duty mode request signal to the primary BS, wherein the low-duty mode request signal comprises information that the mobile device works in the low-duty mode and also comprises an ID of the backup BS.

28. The method as claimed in claim 23, further comprising the following step of:

transmitting a low-duty mode notification signal to the backup BS so that the backup BS is confirmed that: the mobile device works in the low-duty mode, and the mobile device is to perform the data transmission procedure with the primary BS and is to perform only the connection keeping procedure with the backup BS.

29. The method as claimed in claim 23, wherein the step of determining that the data transmission procedure fails further comprises the following step of:

receiving a communication interruption signal from the primary BS, wherein the data transmission procedure is determined to fail according to the communication interruption signal.

30. The method as claimed in claim 23, wherein the primary BS has signal coverage, and the step of determining that the data transmission procedure fails further comprises the following step of:

determining that the mobile device has moved out of the signal coverage of the primary BS, wherein when the mobile device moves out of the signal coverage of the primary BS, the data transmission procedure is determined to fail.

31. A computer program storage product, comprising a non-transitory computer readable medium storing a program of a method for a mobile device, wherein the mobile device is adapted for a wireless network system, the wireless network system comprises a plurality of BSs and a backhaul network device, each of the BSs is connected to the backhaul network device, the mobile device works in a low-duty mode periodically comprising a preconfigured available interval and a preconfigured unavailable interval, and the program comprises:

a code A for receiving BS information of each of the BSs, the BS information of each of the BSs comprising a service loading condition;

a code B for selecting a primary BS and a backup BS from the BSs according to the BS information of each of the BSs;

a code C for performing a data transmission procedure with the primary BS during the preconfigured available interval so as to communicate with the backhaul network device via the primary BS;

a code D for performing a connection keeping procedure with the backup BS during the preconfigured unavailable interval;

a code E for, when communicating with the backhaul network device via the primary BS, determining that the data transmission procedure fails; and a code F for performing a data transmission recovery procedure with the backup BS so as to continuously communicate with the backhaul network device via the backup BS.

32. The computer program storage product as claimed in claim 31, wherein the program further comprises:

a code G for performing a network entry procedure with the primary BS; and a code H for performing a backup network entry procedure with the backup BS.

33. The computer program storage product as claimed in claim 32, wherein the program further comprises:

a code I1 for, after completion of the network entry procedure, receiving a suggestion message from the backhaul network device via the primary BS; and a code J1 for selecting the backup BS from the BSs in response to the suggestion message.

34. The computer program storage product as claimed in claim 32, wherein the program further comprises:

a code I2 for, after completion of the network entry procedure, receiving a suggestion message from the primary BS; and a code J2 for selecting the backup BS from the BSs in response to the suggestion message.

35. The computer program storage product as claimed in claim 31, wherein the program further comprises:

a code K for transmitting a low-duty mode request signal to the primary BS, wherein the low-duty mode request signal comprises information that the mobile device works in the low-duty mode and also comprises an ID of the backup BS.

36. The computer program storage product as claimed in claim 31, wherein the program further comprises:

a code L for transmitting a low-duty mode notification signal to the backup BS so that the backup BS is confirmed that: the mobile device works in the low-duty mode, and the mobile device is to perform the data transmission procedure with the primary BS and is to perform the connection keeping procedure with the backup BS.

37. The computer program storage product as claimed in claim 31, wherein the code E further comprises:

a code E1 for receiving a communication interruption signal from the primary BS,
wherein the data transmission procedure is determined to fail according to the communication interruption signal.

38. The computer program storage product as claimed in claim 31, wherein the primary BS has signal coverage, and the code E further comprises:

a code (E2) for determining that the mobile device has moved out of the signal coverage of the primary BS,
wherein when the mobile device moves out of the signal coverage of the primary BS, the data transmission procedure is determined to fail.

* * * * *